May 17, 1966   R. PLESSIS   3,252,071
ELECTRICAL REGULATING DEVICE
Filed Oct. 3, 1962   2 Sheets-Sheet 1
FIG.1
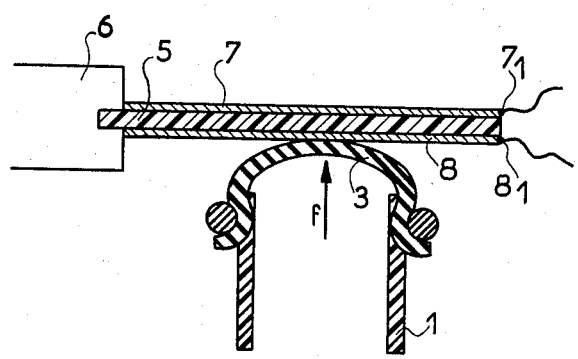
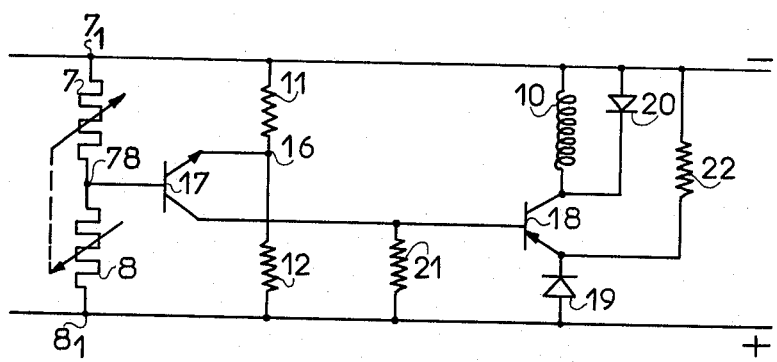
FIG. 2
INVENTOR
ROBERT PLESSIS
BY Paul M. Craig, Jr.
ATTORNEY May 17, 1966  R. PLESSIS  3,252,071
ELECTRICAL REGULATING DEVICE
Filed Oct. 3, 1962  2 Sheets-Sheet 2

INVENTOR
ROBERT PLESSIS
BY Paul M. Craig, Jr.
ATTORNEY 3,252,071
ELECTRICAL REGULATING DEVICE
Robert Plessis, Argenteuil, France, assignor to Société de l'Accumulateur Fulmen, Clichy (Seine), France
Filed Oct. 3, 1962, Ser. No. 228,200
Claims priority, application France, Oct. 9, 1961, 875,424; Sept. 21, 1962, 910,157
14 Claims. (Cl. 320—46)

The present invention relates in general to the provision of an electric regulating device including a variable electrical resistance formed of a layer of conducting grains arranged on a flexible support which may be mechanically deformed in order to vary the resistance.

An object of the present invention is to provide a continuous action electrical regulator having one or several resistances of the above-mentioned type.

The invention has as its object the provision of an electrical regulating device including a variable resistance means constituted by a flexible plate bearing at least one conducting layer. The device according to the invention is designed for the continual regulation of an electrical system comprising a generator, a battery of storage cells and a pneumatic regulator controlled by the pressure of the gases emitted by the battery, said plate bearing the resistance layer or layers being deformed in a continuous manner by the operating organ of said pneumatic regulator, the deformation of which produces a variation of resistance utilised for obtaining a continuous regulation of said electrical system.

The variation of said resistance means is utilised for varying a current which can be amplified by, for example, a transistor to obtain a current of desired magnitude.

The illustrations of the annexed drawing give examples of various embodiments of the arrangement according to the invention:

FIGURE 1 represents the principle of the control operation of a regulating device according to the invention.

FIGURE 2 represents a diagram of the principle of a regulating device according to the invention.

Figure 3:
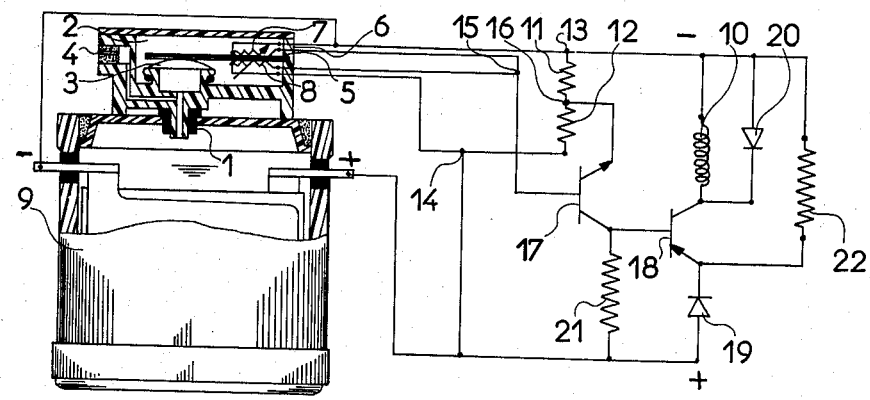
FIGURE 3 represents diagrammatically an embodiment of a regulating arrangement in accordance with the present invention.

FIGURE 1 illustrates the principle of the invention wherein a regulator produces a variable current by way of discharged gases acting on a flexible plate containing conducting layers. The gases discharge is directed by the funnel 1 and acts in the direction of the arrow $f$ on a membrane 3 which swells to cause flexing of a plate 5 mounted on a support 6 and bearing two layers of conducting grains 7 and 8, one on each side thereof. The extremities of the resistances situated near the point of connection of plate 5 with support 6 are electrically connected in such a way as to constitute a common point at the resistances 7 and 8. The other extremities of layers 7 and 8 are linked to the electrical controlling circuit.

The support 6 of the plate 5 carrying the conducting layers can have any useful form: wire, band, thin plate, cylinder, etc. The resistance layer or layers can also have any appropriate form or thickness.

The support 6 can be elastic or have its shape altered according to one's desire to obtain a reversible or permanent variation of the resistance.

The deformation can be cancelled, either by the elasticity of the support, or by any other means, for example, by the elasticity of an annexed part or by the action of a magnet.

Between the two electrical plugs 7, and 8 each layer offers a certain resistance depending on the number and the quality of the contacts between them. If a flexion is applied to the thin plate:

On the concave side, the grains tend to come closer together and the resistance of the layer decreases;

On the convex side, the grains tend to move away from one another and the resistance increases.

By a continuous deformation of the layers 7 and 8, one obtains a continuous variation of the resistance and a continuous regulation of the electrical regulating value.

The plate 5 bears a layer of grains on each side, and the two layers being connected in series, constitute a potentiometer without index, the middle point of which is at a potential depending on the deformation of the support and varying in a continual way with regard to the potentials applied at the two free ends of the resistances.

The layer of grains can be made in any appropriate manner. The following process is recommended:

A liquid capable of dissolving the material of the stand contains the conducting grains in suspension. By spraying or by other means, the liquid is applied to the stand, the surface dissolves more or less and the grains adhere to it. Then the liquid evaporates, the surface gets resolidified and preserves the layer of the grains. The stand is made of a material appropriate to the process. For example, the stand can be made of polystyrene. the liquid of trichloroethylene or of acetone and the grains of graphite.

FIGURE 2 represents an application of this principle of regulation to an electrical system, such as a battery regulating system, which can, for example, be utilised on a motor vehicle.

Points $7_1$ and $8_1$ are respectively linked to the negative and the positive poles of the battery. The intermediate point 78 is connected to the base of a transistor 17, the emitter of which is connected to the point common to the resistances 11 and 12 and the collector is connected to the meeting point of a resistance 21 with the base element of a transistor 18. The emitter of this second transistor 18 is connected at the junction between a diode 19 and a resistance 22. The collector of the transistor 18 is connected to the inductor 10 of the voltage generator of the system. The armature, the battery, and the consumers are not shown. The circuit moreover contains a diode 20 which plays a role of protection.

The operation of the arrangement according to FIGURE 2 is as follows: when the gaseous discharge from the battery is insufficient to swell the membrane 3 (FIGURE 1), the thin plate 5 is at rest, the point 78 is at such a potential that the system allows a predetermined current to flow into the induction winding 10. When the pressure of the gases increases and causes the membrane 3 to swell, the thin plate 5 bends, the resistance 7 decreases and the resistance 8 increases, which diminishes the potential of the point 78. As the potential at point 16 has not materially varied, the current will subside in the emitter of the transistor 17 and also in the collector. The voltage drop across resistance 21 decreases with the decrease in current through transistor 17 which results in an increase in the base potential of the transistor 18, thus provoking a decrease in the emitter bias of the transistor 18. Hence the current in the collector of the transistor 18 and in the inductor 10 decreases, which lowers the voltage in the generator and consequently the charging current, which brings about a reduction of the gaseous discharge. The parameters of the circuit are determined in such a way as to obtain the required adjustment.

FIGURE 3 represents the funnel 1 designed to direct the escape of the gas from a battery to an accumulator surmounted by a regulator 2, bearing a changeable membrane 3 and a calibrated tube 4 for the escape of the gases.

A small plate 5 encased at the point 6 rests on the membrane 3 and bears two conducting layers 7 and 8.

The system of FIGURE 3 contains a storage battery 9 one of the elements of which carries the regulator 2, already mentioned; a generator, of which only the inductor 10 is shown; two resistances 11 and 12 forming with resistances 7 and 8 a Wheatstone bridge of which the current inputs are at 13 and 14 and the current outputs are at 15 and 16, two transistors 17 and 18, two diodes 19 and 20 and two resistances 21 and 22.

The operation of the device according to FIGURE 3 is as follows:

The bridge formed by the resistances 7, 8, 11 and 12 is designed to be unbalanced in order to render the transistor 17 (NPN) normally conducting. The base of the transistor 17 is then positive in relation to the emitter. A current therefore flows through the resistance 21, producing a voltage drop therein. The diode 19, mounted in the direct sense, maintains a predetermined voltage at the emitter of transistor 18 which is little influenced by the intensity of the current passing through the transistor since even if the transistor 18 is blocked, the proper voltage level will be maintained by current flow through the resistance 22.

When the voltage drop across resistance 21 is greater than the drop across diode 19, a current flows in the emitter-base circuit of the transistor 18 (NPN), thus causing a stronger current to flow in the collector and the exciting winding 10 of the generator. The normally blocked diode 20 bypasses voltage transients produced by the interruption of the current in the coil circuit of the inductor when the circuit is interrupted by the contact key.

The initial unbalance of the bridge must be such that the excitation of winding 10 be a maximum.

When the gases appear in the battery, the membrane swells altering the shape of the small plate 5, and causing the resistance 7 to diminish and the resistance 8 to increase. The current diminishes in the resistance 21, and therefore the voltage drop across resistance 21 as well as voltage drop across the emitter-base of the transistor 18, decreases, whence a reduction of the current in the inductor 10 of the generator is effected.

At most, the voltage drop across resistor 21 becomes equal or less than the drop across diode 19, the basic current of the transistor 18 as well as the excitation current reaches a null.

Figure 4:
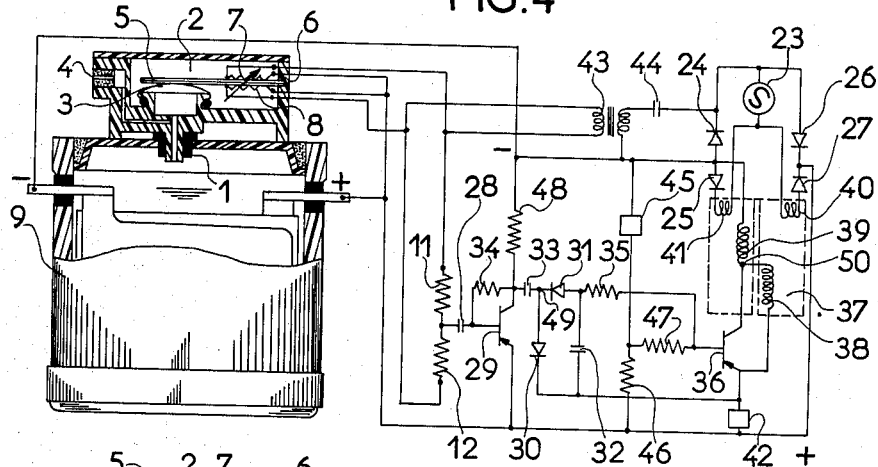
FIGURE 4 represents another embodiment of said regulating arrangement.

FIGURE 4 represents, like FIGURE 3, the funnel 1 designed to direct the escape of gases from a battery to a regulator 2 which bears an alterable membrane 3, and a calibrated tube 4 for the escape of the gases, a small plate 5 encased at point 6. The plate bears two conducting layers 7 and 8. The regulator 2 is mounted on a storage battery 9 and is operatively associated with two resistances 11 and 12 which form with 7 and 8 a Wheatstone bridge.

The generator illustrated is a monophased alternator 23 with permanent magnets with its rectifying bridge formed of four diodes 24, 25, 26, 27.

The diagram shows a first amplifying device and a detector connected to the bridge by a condenser 28 and composed of a transistor 29, of two diodes 30 and 31, of two condensers 32 and 33, and of two resistances 34 and 35. A second amplifying device is constituted by a transistor 36. A transductor 37, which is, in the example chosen, of the self-saturated type, bears two control windings, one with a large number of turns 38, the other with a small number of turns 39, acting in the direction opposite to the former, and two controlled windings 40 and 41 in series with the main rectified circuit.

The winding 38 is fed across the source of polarisation 42, made up, for example, of a diode, as diode 19 in FIGURE 3.

The Wheatstone bridge 7, 8, 11, 12 is fed in alternating current by a transformer 43 and a condenser 44. A voltage limiting device is made up of a source of voltage designated by reference numeral 45 and of two resistances 46 and 47. A resistance 48 links the collector of the transistor 29 to the negative pole of the main circuit.

The functioning of the arrangement according to FIGURE 4 is as follows:

At rest, the bridge 7, 8, 11, 12 fed by an alternating current by the transformer 43 is balanced—no alternating voltage appears in the base of the transistor 29. The potential of the collector of the transistor 29 is therefore constant.

The state of the charge in the condenser 33 being constant, the point 49 is at the potential of the emitter of the transistor 36. In fact, if the point 49 were positive in relation to the emitter of the transistor 36, a current would flow in the diode 30, modifying the charge of the condenser 33. If the point 49 were negative in relation to the emitter of the transistor 36, a current would flow across the emitter-base circuit of the transistor 36, the resistance 35 and the diode 31, modifying the charge of the condenser 33. In both cases, an equilibrium is established, after which a current no longer passes in the resistance 35.

When the small plate 5 is not acted upon by the gaseous discharge and if there passes no current in the resistance 47, the transistor 36 is blocked, no basic current passes.

Under these conditions, the winding 38 is fed by the source of polarisation 42 and the winding 39. The resulting field corresponds to a number of ampere-turns equal to: $(N38-N39)i$, that is, quite close to $N38i$. The values are such that the transductor is saturated.

The working windings 40 and 41, in these conditions, do exert but a minimum impedance and the supply of the alternator 23 to the battery 9 is at a maximum.

On the other hand, if the gaseous discharge of the battery, by deforming the small plate 5, causes the appearance of a disequilibrium voltage of the bridge 7, 8, 11, 12, amplified by the transistor 29, the point 49 is the seat of an alternating voltage, on all sides of the potential of the emitter of transistor 36. The two alternations of the alternating voltage at the point 49 are rectified by the circuit which doubles the voltage and is constituted by 30, 31, 32 and 33. The rectified voltage appearing on 32 is applied between the emitter and the base of the transistor 36 across the resistance 35 the value of which is essentially determined by the regulation limit desired by the control pressure. A current arises in the base of 36, thus provoking the appearance of a collector current and the feeding of the winding 39. The number of the ampere-turns supplied by 39 increases, while that supplied by 38 diminishes, because the potential of point 50 becomes more positive owing to the fall of voltage in 39. The transductor 37 is therefore less saturated, the impedance of the windings 40 and 41 increases and the rectified current of the alternator 23 diminishes.

When the transistor 36 is saturated, the voltage at its ends is negligible, the winding 38 is then no longer fed and the winding 39 supplies all the ampere-turns. The resulting field has been reversed with regard to the blocking position of the transistor 36, the working windings of the transductor then offer an increased impedance and the rectified current of the alternator 23 is a minimum.

This inversion of the control field, which allows the use of the whole extent of the regulation limit, is necessitated by the self-saturated transductor chosen in the example under consideration.

The limitation device of voltage 45, 46, 47 works in the following way:

The voltage at the ends of the resistance 46 is equal to the difference between the voltage of the battery 9 and the reference voltage 45. As long as this difference is less than the voltage of polarisation 42, the resistance 47 can supply at the base of 36 only a positive voltage with regard to the potential of the emitter, which does not provoke any basic current. Everything then happens as if the network 45, 46, 47 did not exist.

But if the voltage on 46 reaches a value superior to the voltage of polarisation of 42, the base of the transistor 36 is negative with regard to the emitter, a basic current flows across the resistance 47, whether there be a gaseous discharge or not, and the transductor 37 limits the current supplied by the alternator.

If the source of reference 45 is constituted by a non-linear resistance, the value of the resistance 46 allows the determination of the start of the operation of this protection. The resistance 47 allows the determination of the regulation limit obtained of the voltage.

Figure 5:
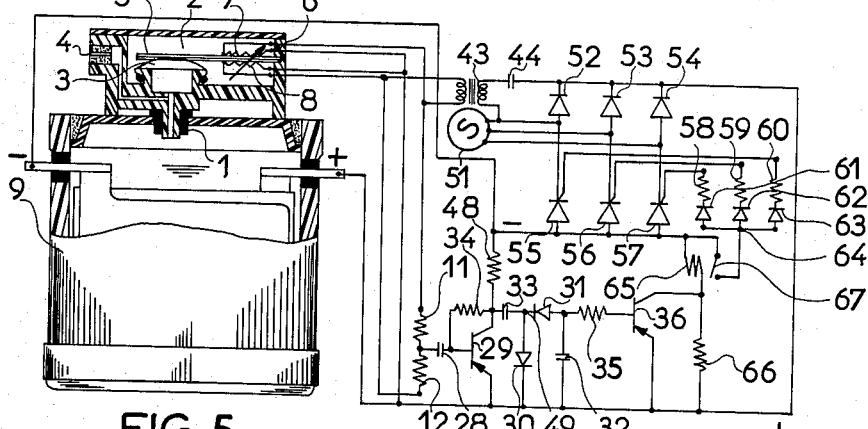
FIGURE 5 represents still another embodiment of said regulating arrangement.

FIGURE 5 represents a diagram showing, like that of FIGURE 4, the funnel 1 of the discharge of the gases from a battery element, surmounted by its regulator 2 based on the gaseous discharge, comprising a changeable membrane 3, a calibrated tube for the escape of the gases 4, a small plate 5 encased at point 6, bearing two conducting layers 7 and 8, a storage battery 9 of which one of the elements bears the regulator 2 already mentioned and two resistances 11 and 12 constituting with 7 and 8 a Wheatstone bridge.

As in the diagram of FIGURE 4, a first amplifying organ and a detector connected to the bridge by a condenser 28, bear a transistor 29, two diodes 30 and 31, two condensers 32 and 33 and two resistances 34 and 35. A second amplifying organ is constituted by a transistor 36. The bridge 7, 8, 11, 12 is fed in an alternating current by a transformer 43 and a condenser 44.

The generator is here a tri-phased alternator 51 with permanent magnets. Its rectifying system bears three simple diodes 52, 53, 54 and three controlled diodes 55, 56, 57. The control circuit of these diodes bears three resistances 58, 59, 60 and three simple diodes 61, 62, 63 connected among themselves at point 64.

A regulator with vibrating blade has its coil 65 connected to the ends of the battery by means of a resistance 66 and its blade 67 in series with the control circuit of the controlled diodes.

The operation of the device according to the diagram 5 is as follows:

When the battery is but weakly charged no gaseous discharge takes place. The Wheatstone bridge-amplifier-detector system is in equilibrium, there is no current in resistance 35, there is no basic current in the transistor 36, it is blocked. The voltage of the battery 9 is low. The division of the voltage between the coil 65 and the resistance 66 is such that the coil does not attract the blade 67 the contacts of which remain closed. The control circuits of the controlled diodes 55, 56, 57 can shut themselves and at each alternation each phase sends an impulse of charging current to the battery, which thus receives a continuous flow of impulses of current constituting the maximum charge.

When the gaseous discharge moves the plate 5, the system sends through the resistance 35 a current into the base of the transistor 36 which then supplies parallel to the resistance 66. The voltage at the ends of the coil 65 increases enough to attract its blade 67. The control circuits of the diodes are cut and the battery ceases to receive current. The voltage falls, the paddle cease being attracted and the cycle begins again. The vibration of the blade brings about, according to the classic process, a state of equilibrium, provoking a charging current less than the maximum current.

As the gaseous discharge increases, the current in the transistor 36 increases as well as the voltage at the terminals of the coil 65 and the equilibrium is established for a weaker and weaker charging current.

The system then works like a regulator with vibrating blade controlled by the gaseous discharge.

Coil 65 and resistance 66 play the role of voltage controller, even in the absence of gaseous discharge, in a way analogous to the device of FIGURE 4.

In the case where the regulator based on the gaseous discharge fails, for example if the battery bearing such a regulator is replaced by an ordinary battery, there remains in the cases of FIGURES 4 and 5 a regulation based on voltage, which does not have the advantages of the regulation based on the gaseous discharge, but nevertheless permits the functioning of the system.

The three diagrams show generators of different types to illustrate better the invention. Each design can be realised with several types of generators.

The blade can be constituted by a metal stand with, for example, a steel blade, on which one or several insulating sheets previously smeared with the already mentioned resisting layer are laid by pasting. Different arrangements of circuits can be realised on the blade properly said, thus allowing the setting up of the desired diagrams.

Without departing from the scope of the invention, the resistances 11 and 12 can be mounted, one or the other or both, on the plate 5 and can be thus found to vary also; the bridge can bear an initial regulation.

I claim:
1. An electrical regulating device comprising substantially non-compressible variable resistance means formed by at least one layer of electrically conducting granular material deposited on the surface of a flexible blade,
a battery, an electrical generator means connected to said battery for supplying charging current thereto, pneumatic regular means mechanically connected to said battery and operatively associated with said blade for deforming said blade in a continuous manner in response to the pressure of the gas discharged by said battery and control means for continuously regulating the charging current supplied by said generator means to said battery in response to the continuous variation of the resistance of said resistance means due to the deformation of said blade.
2. An electrical regulating device as defined in claim 1 wherein a variation in potential is supplied by said variable resistance means and applied to an amplifying device which forms part of said control means.
3. An electrical regulating device as defined in claim 2 wherein said amplifying device is a transistor amplifier.
4. An electrical regulating device as defined in claim 1 wherein said blade is provided with two layers of electrically conductive granular material providing separate variable resistances, an additional pair of resistances connected to said separate variable resistances to form a Wheatstone bridge circuit, said separate variable resistances being provided on said blade so as to vary in value in opposite sense upon deformation of said blade.
5. An electrical regulating device according to claim 4, wherein said Wheatstone bridge is connected to said battery.
6. An electrical regulating device according to claim 4, wherein said Wheatstone bridge is connected to said generator.
7. A method for making a variable resistance element including a deformable plate comprising the steps of suspending a granular resistance material and a liquid capable of dissolving said plate, applying said suspension to said plate, and allowing said liquid to evaporate from said plate leaving the granular resistance material in contact therewith.
8. Electric regulating device for an electrical system including a generator, and a storage battery comprising a pneumatic regulator having a contact element controlled by the pressure of the gases discharged by the battery including calibrated tube means for controlling the discharge of said gases, means for controlling charging of said battery by said generator including at least two variable resistances constituted by a thin flexible plate bearing at least two substantially non-compressible conductive layers of granular material, the thin plate being displaced in a continuous manner by the control element of said pneumatic regulator acting in response to that portion of the gaseous discharge exceeding the capacity of flow of the calibrated tube means, the deformation of the plate producing a variation in the resistance of each of the conductive layers which is utilized to obtain a continuous regulation of the charging of said battery.

9. Electric regulating device according to claim 8, wherein the variable resistances carried by the plates constitute, together with other resistances, a Wheatstone bridge, the bridge emitting an electric signal which varies in a continuous manner in response to the displacement of the plate actuated by the gaseous discharge, and means for amplifying and modifying this signal to obtain a continuous regulation.

10. Electric regulating device according to claim 9, wherein the electric signal emitted by the Wheatstone bridge is applied to an amplifier constituted by at least one transistor and the outlet circuit of which is connected to the inductor of the generator.

11. Electric regulating device according to claim 9, wherein the electric signal emitted by the Wheatstone bridge, amplified by an amplifier comprising at least one transistor, acts on the control windings of a transducer the principal windings of which are branched in series in the principal circuit of the generator to obtain a continuous regulation.

12. Electric regulating device according to claim 9, wherein the electric signal emitted by the Wheatstone bridge, amplified by an amplifier comprising at least one transistor, acts on the coil of a voltage regulator having a vibrating blade which controls the gates of controlled diodes intercalated in the principal circuits of the generator to obtain a continuous regulation.

13. An electrical regulating system comprising variable resistance means for producing a variable resistance in response to physical deformation thereof including a flexible blade having at least one substantially non-compressible resistive coating of granular material whose density varies with flexing of said blade thereon, a battery, a voltage generating means connected to said battery for maintaining the charge on said battery at a prescribed level, control circuit means connected to said variable resistance means including at least one amplifying means responsive to the change in resistance of said variable resistance means for regulating the charging of said battery by said voltage generating means, and pneumatic regulator means for producing deformation of said variable resistance means in proportion to the gas discharge from said battery.

14. An electrical regulating device for regulating an apparatus the state of which is determined by the pressure of a gas in a container comprising a support member, a flexible plate secured at one end to said support member, said plate supporting at least one substantially non-compressible layer of granular resistance material whose density varies upon deformation of said plate, means associated with said plate for effecting the deformation thereof in response to detected changes in gas pressure in said container, and means for controlling the state of said apparatus in response to the density of said granular resistance material.

References Cited by the Examiner
UNITED STATES PATENTS

| | | | |
|---|---|---|---|
| 2,171,793 | 9/1939 | Huth | 338—100 X |
| 2,375,178 | 5/1945 | Ruben | 117—226 X |
| 2,621,317 | 12/1952 | Ihrig | 320—46 X |
| 2,878,442 | 3/1959 | McKenney | 323—75 |
| 2,900,592 | 8/1959 | Boruch | 310—152 X |
| 3,010,863 | 11/1961 | Coe et al. | 156—298 X |
| 3,056,913 | 10/1962 | Henderson et al. | 322—28 |
| 3,080,757 | 3/1963 | Johansson | 338—42 X |
| 3,123,758 | 3/1964 | Giacalone | 320—46 X |

FOREIGN PATENTS 737,008   9/1955   Great Britain.

LLOYD McCOLLUM, *Primary Examiner.*

MILTON O. HIRSHFIELD, *Examiner.*

G. H. GERSTMAN, S. WEINBERG,
*Assistant Examiners.*